April 14, 1942.  H. H. ROAKE  2,279,494
GRINDER
Filed July 22, 1940
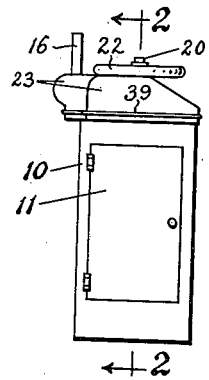
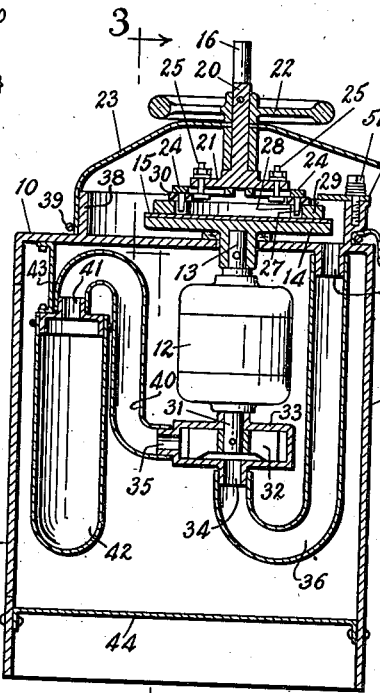
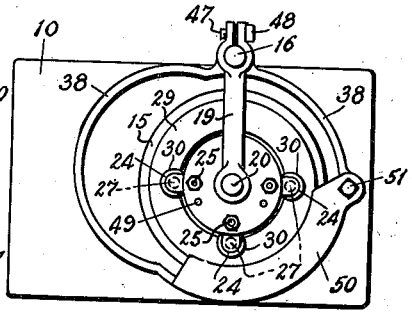
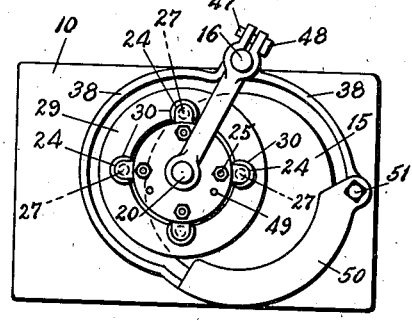
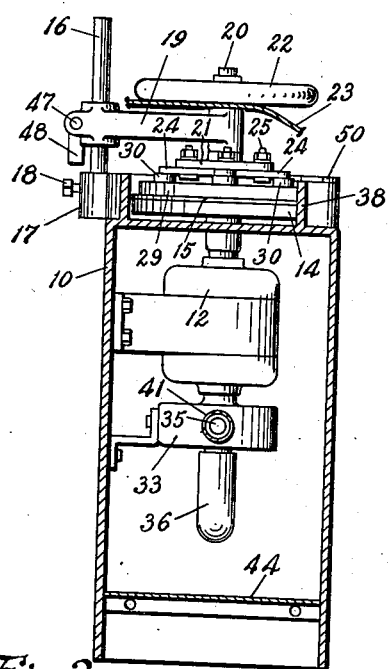
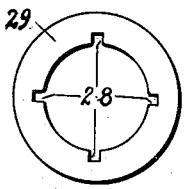
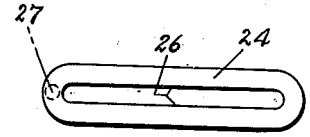
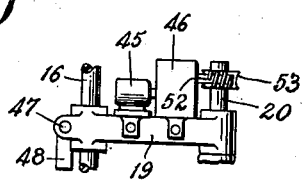
INVENTOR.
Harris H. Roake
BY Henry Molz
ATTORNEY Patented Apr. 14, 1942

2,279,494

UNITED STATES PATENT OFFICE 2,279,494

GRINDER

Harris H. Roake, Glendale, Calif.

Application July 22, 1940, Serial No. 346,701

1 Claim. (Cl. 51—124)

The primary object of my invention is the provision of a grinding tool of machine type, specifically designed for the more accurate grinding of clutch pressure plates, although in no sense specifically limited thereto.

An object of the herein invention is to provide a machine tool of said character manually operable as well as mechanically or power driven.

A further highly important object is to provide a machine tool of said type which will grind the object placed thereon to a smoothly, uniform flat surface.

A further object is the provision of a grinder adaptable for use with either abrasive stones or abrasive paper discs, either being readily attachable to the machine and for a common purpose.

A further important object is to provide a compact unitary portable structure, self-contained, light in weight, compactly built, practically foolproof in operation, and meeting every requirement of a tool grinder suitable for clutch pressure plate grinding, and the like, and reducing the grinding operation to a minimum.

A still further object of the herein invention is to provide a machine tool of mechanically driven type, automatic in action once the grinding operation is started and requiring no supervision or attention during such grinding operation.

And a further object in the provision of a grinder permitting rapid grinding of clutch pressure plates in particular, in contra-operation to the slow, cumbersome and unsatisfactory methods in common practice; a present method of grinding such plates quite frequently distorting the plates upon tightening them in the process of mounting in jigs and chucks, and seldom resulting in a uniform flat smooth surface. Another method is to mount the plates on a lathe and grind them with a tool post grinder. The latter practice like the former also distorts the plates, results in a like unsatisfactory job, and seldom leaves the plates of uniform thickness.

Moreover, using either method, the operating time consumed amounts to from 20 to 30 minutes under competent supervision. With the use of the herein invention, from 5 to 8 minutes will adequately grind the average plate, do it in a highly satisfactory manner, and without expert supervision.

Other objects and advantages of the invention will more fully appear as this specification proceeds and as is set forth in the appended claim.

I attain these objects by the machine disclosed in the accompanying drawing, in which, Figure 1 is an elevation of the grinder;

Figure 2 is a vertical section on line 2—2 of Figure 1;

Figure 3 is a section on line 3—3 of Figure 2;

Figure 4 is a plan view of the grinder in a neutral position and with the hand wheel and cover removed;

Figure 5 is a plan view similar to Figure 4, but showing the grinding mechanism moved into operating position;

Figure 6 is a plan view of an adjustable bar used in the machine;

Figure 7 is a plan view of one type of pressure plate, the same being shown in other views of the drawing, and Figure 8 is an elevation of one form of motor drive attachment and converting the manually operatable grinder into a mechanical or power driven tool.

Similar numerals of reference indicate like parts thruout the several views, thus the numeral 10 indicates a cabinet structure having a door 11, and which structure may readily be designed in numerous ways other than as shown. The cabinet houses a motor 12 having a shaft 13 extending upwardly through an aperture provided in the top if the cabinet. A plate 14 is secured to said shaft 13 adjacent the top of the cabinet, and forms a turn-table revolving with the rotation of said shaft, and to which a suitable abrasive material, as an abrasive stone or paper abrasive disc 15 is detachably secured in convenient manner.

A post 16 is mounted at the top and at one side of the cabinet in a boss 17 and may be secured as by a set screw 18.

An arm 19 having one end vertically and rotatably adjustable upon the post 16 is provided with a bearing at the other end, and in which is journaled a vertical shaft 20 having an annular enlargement 21 integral with the lower end of said shaft, and a hand wheel 22 detachably connected to the upper end thereof.

Before connecting the wheel 22 to the shaft 20, a canvas or other flexible cover 23 may be placed over the cabinet top. It is provided with suitable apertures (not shown) permitting the post 16 and the shaft 20 to protrude through the cover.

A plurality of adjustable bars 24 extend in a spoke-like manner from the underside of the annular member 21 and to which they are attached by convenient means, as by bolts 25 in association with slots 26 provided in said bars 24. Each of said bars is provided with a depending lug or pin 27 which in operation is associated with notches or apertures 28 in a clutch pressure plate 29 as shown, or of other types (not shown) but common to the art.

A washer 30 of resilient material is provided about the pin 27 between the bar 24 and the plate 29 to neutralize vibration of the associated parts.

The shaft 13 of the motor 12 also extends downwardly so that its end 31 operates to drive a suction and blower fan 32 thereto attached, and enclosed in a housing 33 having an inlet 34 and an outlet 35. The inlet 34 is connected by means of a tube 36 to a drain spout 37 provided in the cabinet top.

A barrier or wall 38 is built-up from the cabinet top and surrounds the turntable plate 14. The lower edge of the cover 23 is secured about the periphery of said wall 38 as by a draw string 39 or other convenient means so as to adequately enclose the abrasive stone or disc 15 together with the clutch pressure plate during the grinding operation.

The outlet 35 is connected by means of a tube 40 to the inlet 41 of a dust collector bag 42 which may be suspended within the cabinet by a hanger 43.

A shelf 44 is provided within the cabinet to store additional grinding abrasives, tools, and the like.

A motor 45 may be substituted for the hand wheel 22 to drive the shaft 20, and in connection therewith, a gear reduction box 46, a worm 52 and a worm wheel 53 are provided as a means for driving the shaft 20 from said motor 45; suitable attachment of the motor 45 and gear reduction box 46 with the arm 19 may be affected as is disclosed in Figure 8, said means, however, being but one of numerous means readily apparent to any one skilled in the art.

A screw 47 having a handle 48 is provided on the arm 19 to set the arm at any desired position upon the post 16.

Extra holes 49 may be provided in the annular member 21 for the engagement of pressure plates or other material to be ground, and having a number of notches 28 other than four.

An arcuately shaped plate 50 may be pivoted upon the wall 38 at 51 so as to overhang the spout 37 to facilitate the down-draft of the dust.

In operation, a clutch plate or other material to be ground is placed upon the disc or stone 15 and the arm 19 is lowered until the pins 27 carried by the bars 24 are adjusted in the notches 28 of the clutch pressure plate 29 as shown in Figure 2 so as to hold said clutch plate against the grinder and provide for turning thereof relative to the grinder. The motor 12, connected to the source of electrical energy (not shown) is then energized and the arm 19 is preferably swung into the position shown in Figure 5, and later swung back to the position shown in Figure 4 as the motor is de-energized.

The grinding dust created in the course of the operation is simultaneously with the grinding operation drawn from the work by the fan 32, and in turn forced into the bag 42 which may readily be removed for emptying through the door 11 of the cabinet 10 at the convenience of the operator.

Grinding and resurfacing of an article, clutch pressure plate, or otherwise, is accurately and quickly accomplished, and free from the usual obstacle of dust packing or accumulating. As the clutch pressure plate, for example, is laid on the abrasive with the center of the former over the center of the latter, the abrasive after a few turns of operation normally would become loaded or clogged with the dust grindings resulting from the operation, and the cutting action would cease. This is entirely and positively eliminated with the herein invention, in that its operating principle is such as to constantly clear said dust grindings between the work and abrasive, the off-set movement of the grinding operation swinging the work off-center so that the inner edge of the work is just off the outer edge of the abrasive and momentarily held in said position by the arm. Thus the dust grindings during the operation are continuously set free, so that the constant influence of the suction fan frees the operation thereof and conveys the grinding dust to the bag 42.

Freedom from dust particles and grindings thus enhances the cutting speed, assures a clean evenly distributed grind, an accurately surfaced job in a minimum of time, at lowered costs, and sanitary working conditions conforming with State safety laws and regulations.

In its marked simplicity, ease of operation, and ability to readily and quickly accomplish a highly satisfactory grinding operation, the grinder marks an advance in machine tools of its type.

It may readily be produced in various sizes and of materials obtainable in the open market, and at reasonable cost, and, in its structural assembly, can be produced at a very reasonable cost.

I am aware that slight modifications may from time to time be made in the details of structure illustrated without departing, however, from the scope of the present invention, and as defined in the claim which is appended hereto. Hence, I do not limit my present invention to the exact description or embodiment of structure as herein disclosed, but in general, what I do claim is:

In a grinder, a rotatable grinding member adapted to support the work thereon during grinding, and a work holding and adjusting means including an arm mounted to swing back and forth over the grinding member, a rotatable shaft mounted on said arm for swinging movement therewith and work engaging means on said shaft operating to slide the work relative to and on the grinding member upon the swinging of said arm and to rotate the work relative to and on said grinding member, upon the rotation of said shaft, said work engaging means including slotted members, fastenings extending thru slots in said members for adjustably securing them to said shaft, pins depending from said slotted members for engaging the work, and resilient cushion members on said slotted members and adapted to have tensioned engagement with the work.

HARRIS H. ROAKE.